United States Patent [19]

Anthias et al.

[11] Patent Number: 5,692,191
[45] Date of Patent: Nov. 25, 1997

[54] ADDRESS SPACE UTILIZATION IN A DISTRIBUTED DATA PROCESSING SYSTEM

[75] Inventors: Taf Anthias, Ampfield; Harry Halliwell, Winchester; John Francis Minshull, Kings Sombourne, all of England

[73] Assignee: International Business Machines Corporation, Armonk, N.Y.

[21] Appl. No.: 290,910

[22] PCT Filed: Dec. 23, 1993

[86] PCT No.: PCT/GB93/02641

§ 371 Date: Aug. 22, 1994

§ 102(e) Date: Aug. 22, 1994

[87] PCT Pub. No.: WO94/15288

PCT Pub. Date: Jul. 7, 1994

[30] Foreign Application Priority Data

Dec. 24, 1992 [GB] United Kingdom ............... 9226933

[51] Int. Cl.⁶ .................................................. G06F 13/42
[52] U.S. Cl. ............... 395/670; 395/200.03; 395/500; 395/680; 395/200.04; 364/222.2; 364/284.4
[58] Field of Search .................................. 395/650, 700, 395/725, 670, 200.03, 500, 680, 200.04; 364/280, 280.6, 281.6, 222.2, 284.4

[56] References Cited

U.S. PATENT DOCUMENTS

| | | | |
|---|---|---|---|
| 4,454,575 | 6/1984 | Bushaw et al. | 364/DIG. 1 |
| 4,677,546 | 6/1987 | Freeman et al. | 364/DIG. 1 |
| 4,780,821 | 10/1988 | Crossley | 364/DIG. 1 |
| 4,994,963 | 2/1991 | Rorden et al. | 364/DIG. 1 |
| 5,109,515 | 4/1992 | Laggis et al. | 395/725 |
| 5,123,106 | 6/1992 | Otsuki et al. | 395/725 |
| 5,124,909 | 6/1992 | Blakely et al. | 395/200 |
| 5,274,789 | 12/1993 | Costa et al. | 395/425 |
| 5,276,883 | 1/1994 | Halliwell | 395/700 |
| 5,321,841 | 6/1994 | East et al. | 395/725 |
| 5,333,319 | 7/1994 | Silen | 395/650 |
| 5,375,207 | 12/1994 | Blakely et al. | 395/200 |
| 5,392,400 | 2/1995 | Berkowitz et al. | 395/200 |
| 5,442,791 | 8/1995 | Wrabetz et al. | 395/650 |
| 5,475,819 | 12/1995 | Miller et al. | 395/200.03 |

*Primary Examiner*—Kevin A. Kriess
*Assistant Examiner*—Majid A. Banankhah
*Attorney, Agent, or Firm*—Volel Emile; Andrew J. Dillon

[57] ABSTRACT

In a distributed data processing system running multiple applications on the client system resources specific to an application which have no impact on the overall display at the server, are stored in application address space. Resources which have an effect on the overall system and which are managed in the client system are stored in common presentation address in the client system. Resources which have an overall effect and are managed in the server system are stored in the display server system.

7 Claims, 4 Drawing Sheets

5,692,191

ADDRESS SPACE UTILIZATION IN A DISTRIBUTED DATA PROCESSING SYSTEM

TECHNICAL FIELD

This invention relates to distributed data processing systems. More particularly, this invention relates to the control of resources distributed data processing systems.

BACKGROUND ART

In a distributed data processing system such as that schematically illustrated in FIG. 1 (the same reference numerals denote the corresponding integers in FIGS. 2 to 4), a computer user typically interacts with a local terminal 2 (also known as the server system), which is connected to a remote processing system 4 (also known as the client system). The remote processing system 4 may not necessarily be situated any great distance from the local terminal 2, e.g. a PC workstation and host processor in a local area network where the client processing system and the workstation server are in the same building or possibly even the same office.

At the disposal of the computer user are a number of resources such as graphical user interface 6, a graphics tablet 8, a database 10 and a laser printer 12. It is desirable that the user should be able to run more than one application program A1, A2, A3 at a time, so called multitasking. At least some of the resources, such as the graphical user interface 6, will be shared between the application programs, whilst others, such as the graphics tablet 8 and database 10, will only be used by one of the applications.

Each of the resources has associated with it an area of operating system address space in the computer memory to enable that resource to be controlled and operated. These areas are indicated in FIG. 1 by P for the printer, D for the database, W for the graphical user interface and T for the graphics tablet. Each of the application programs execute in separate operating system address space, so as to protect one application program's data from another's. However, in the case of a shared resource all the application programs need to be able to work in some way with the operating system address space for that resource. When a number of application programs are interfacing with a display device, the presentation system needs to manage shared resources (such as window geometry, fonts, metafiles, etc.) as well as inter-client communication resources (such as window messages, cut-and-paste operations, etc.).

One possible approach to this problem is that shown in FIG. 1. The resources are managed in application processing mode using shared memory. This provides all the application programs with access to all the resources with a relatively simple and efficient implementation, but allows one application program to adversely affect the system and other application programs if a problem occurs with that one application program.

Another possible approach is to manage the resources in a separate protected address space as illustrated in FIG. 2. This provides the required protection, but on many systems requires a relatively slow mode switch to enter this protected address space. It also introduces the need for the copying of data between the application and protected address space, as well as mode switching back and forth when call-backs are provided by the resource being addressed.

A further possible approach would be to provide for the resources to operate in the system address space as illustrated in FIG. 3. However, this sort of operation is only really suitable for low-level kernel system services which are unlikely to change frequently. Resources such as graphical user interfaces and printer support are usually independently developed from the system core and subject to an unacceptably high frequency of change.

None of these alternatives is able to provide a system which combines a high degree of intra-application isolation with good efficiency.

DISCLOSURE OF INVENTION

Viewed from one aspect the invention provides a data processing apparatus having a local processor coupled to a remote processor, for performing distributed multitasking processing with a plurality of application programs executable at said remote processor, and resources including at least one local resource associated with the local processor, at least one shared resource associated with said remote processor and at least one unshared resource associated with said remote processor, wherein said local resources use address space at said local processor, said shared resources use protected address space at said remote processor and said unshared resources use their corresponding application's address space at said remote processor.

Using the configuration of the invention the number of slow mode switches is reduced whilst access to shared resources is allowed to all the application programs and good degree of inter-application protection is provided. This leads to improved performance of the distributed data processing system.

In preferred embodiments of the invention requests for access to resources associated with the remote processor initiated in the local processor are buffered before sending. This feature results in improved efficiency with less communication line turn around.

BRIEF DESCRIPTION OF DRAWINGS

In order that the invention may be fully understood preferred embodiments thereof will now be described, by way of example only, with reference to the accompanying drawings in which.

BEST MODE FOR CARRYING OUT INVENTION

The invention will be described using the terminology of the IBM OS/2 Presentation Manager system, graphics calls which relate to the presentation space of that application are handled in user mode in the application's address space. The presentation space is not protected from the application, but only the application itself is affected if it is corrupted. Access to bitmaps, fonts and colour tables is through server functions which the client system doesn't directly address. Many of the windowing functions fall into the category of application unique resources since many interfaces between the application and the window management function require access to a single window or just windows belonging to the application itself (which can be kept in the application's address space). Where access to global structures is required (for example to enumerate all windows in the system or to process exposed regions), the presentation function switches in the presentation address space (for example, the chaining for the window hierarchy across applications is kept in this address space. A global structure is managed in the server and available to all clients.

Figure 1:
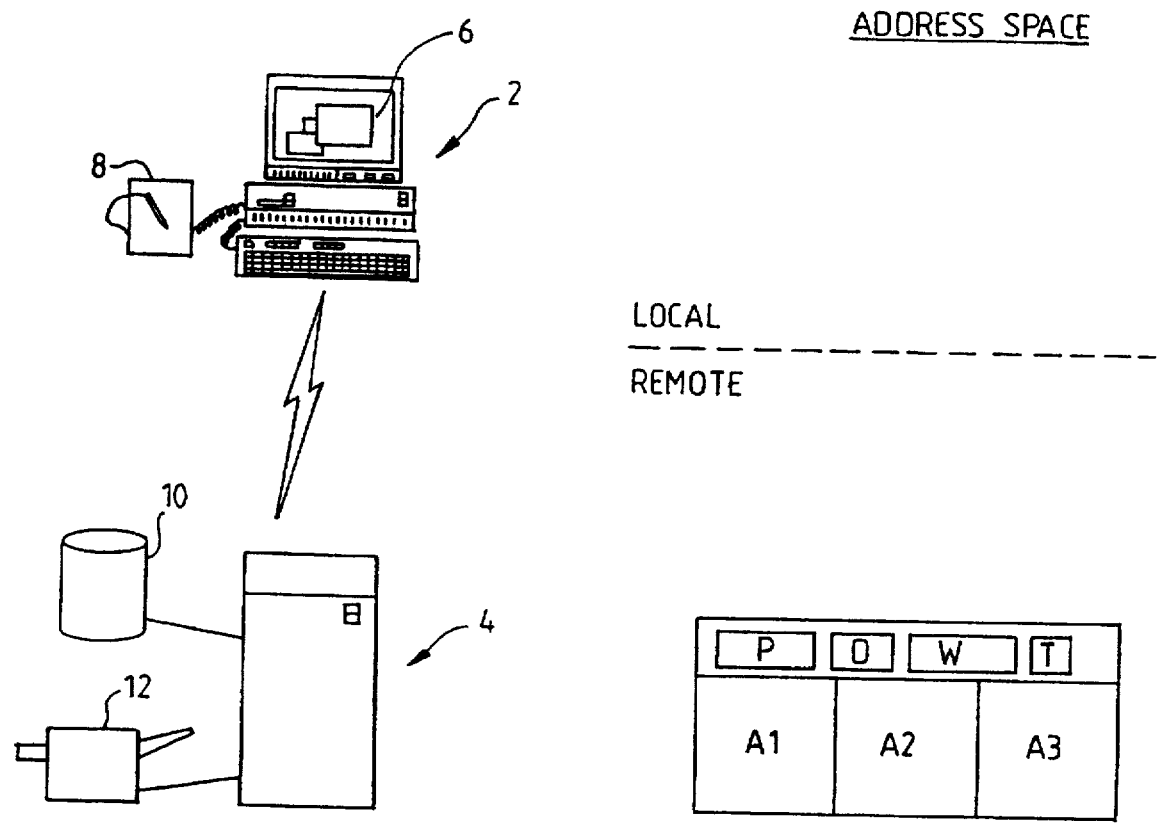
FIG. 1 shows a schematic example of a distributed data processing system.
Figure 2:
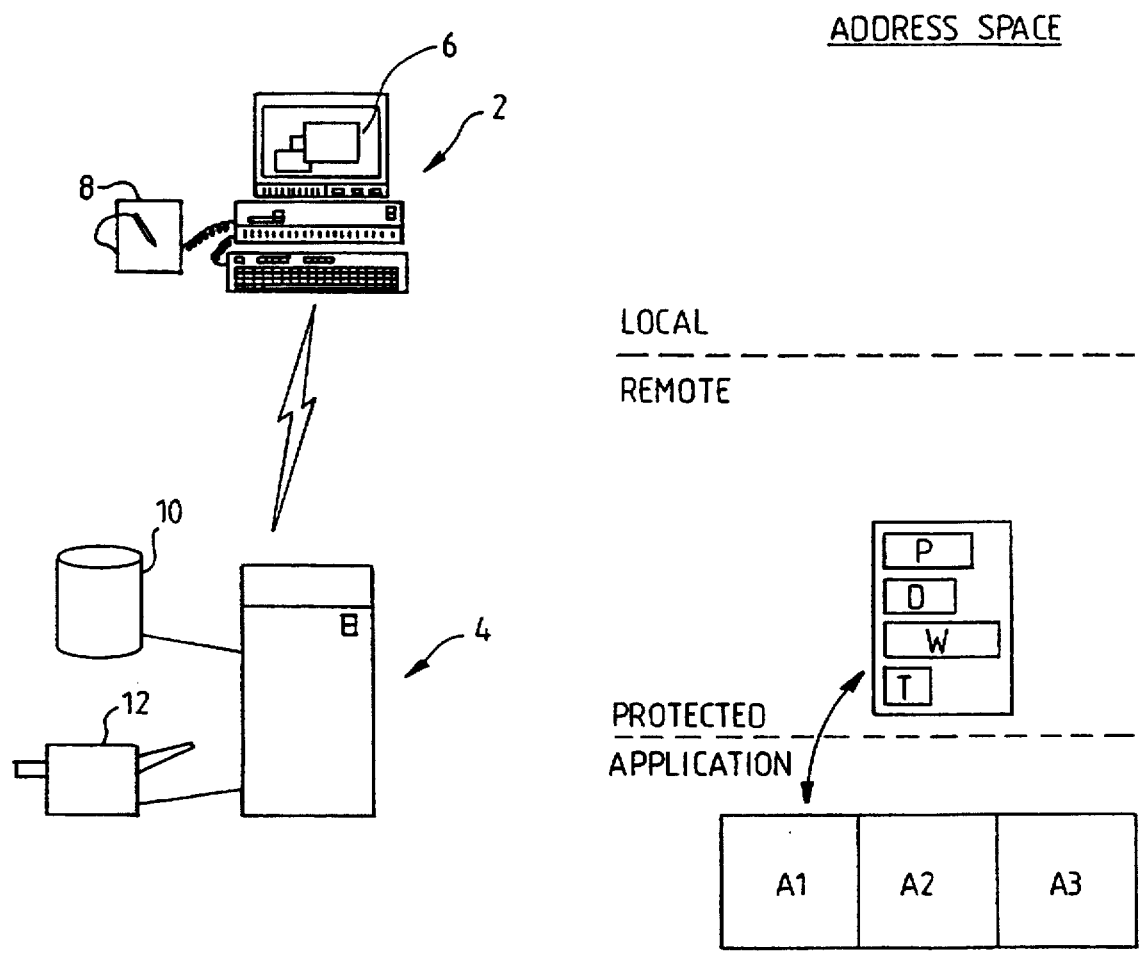
FIG. 2 shows schematically, the known method of managing resources in a separate protected address space.
Figure 3:
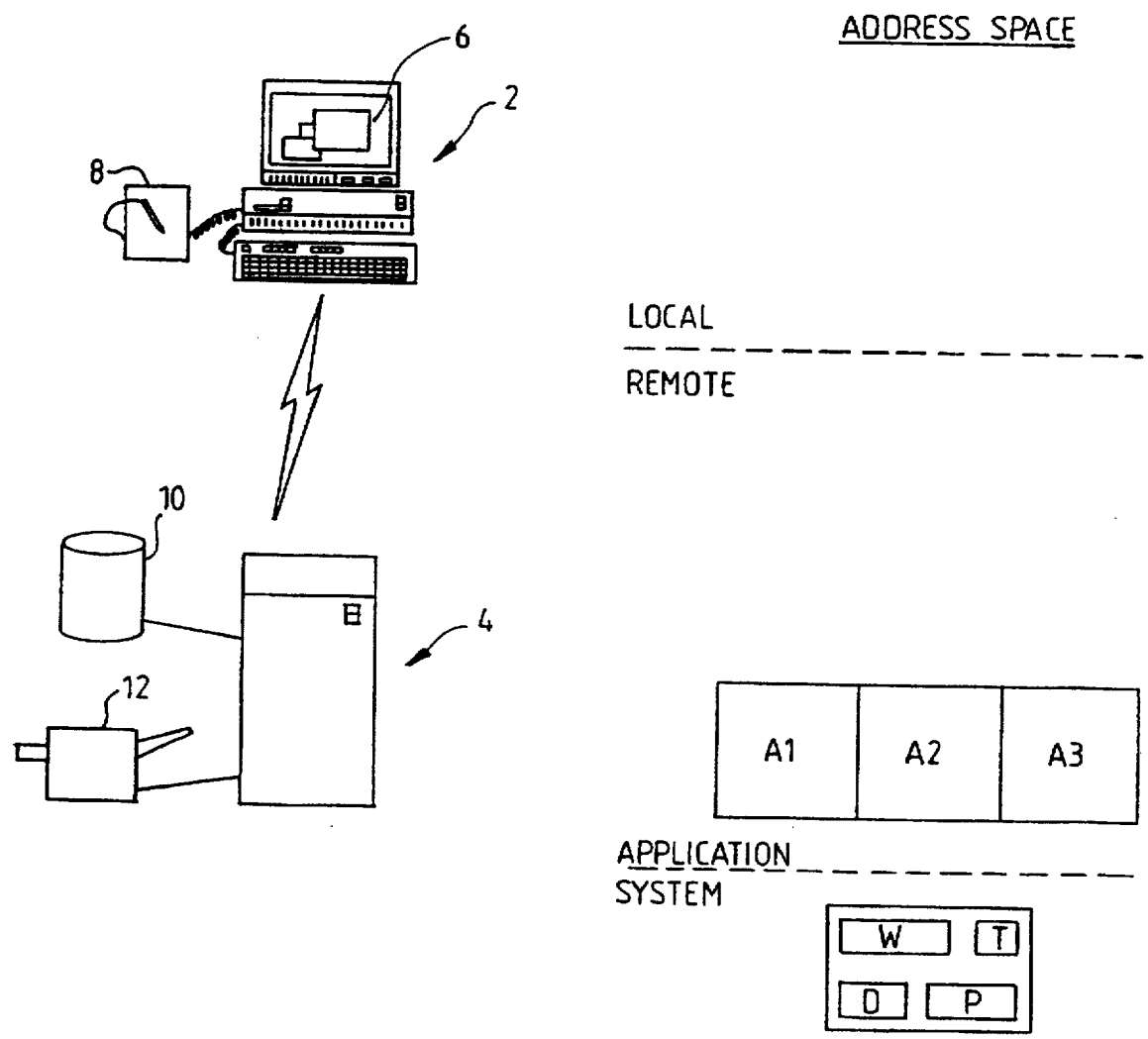
FIG. 3 shown schematically, the known method of managing resources by providing for their operation in the system address space.
Figure 4:
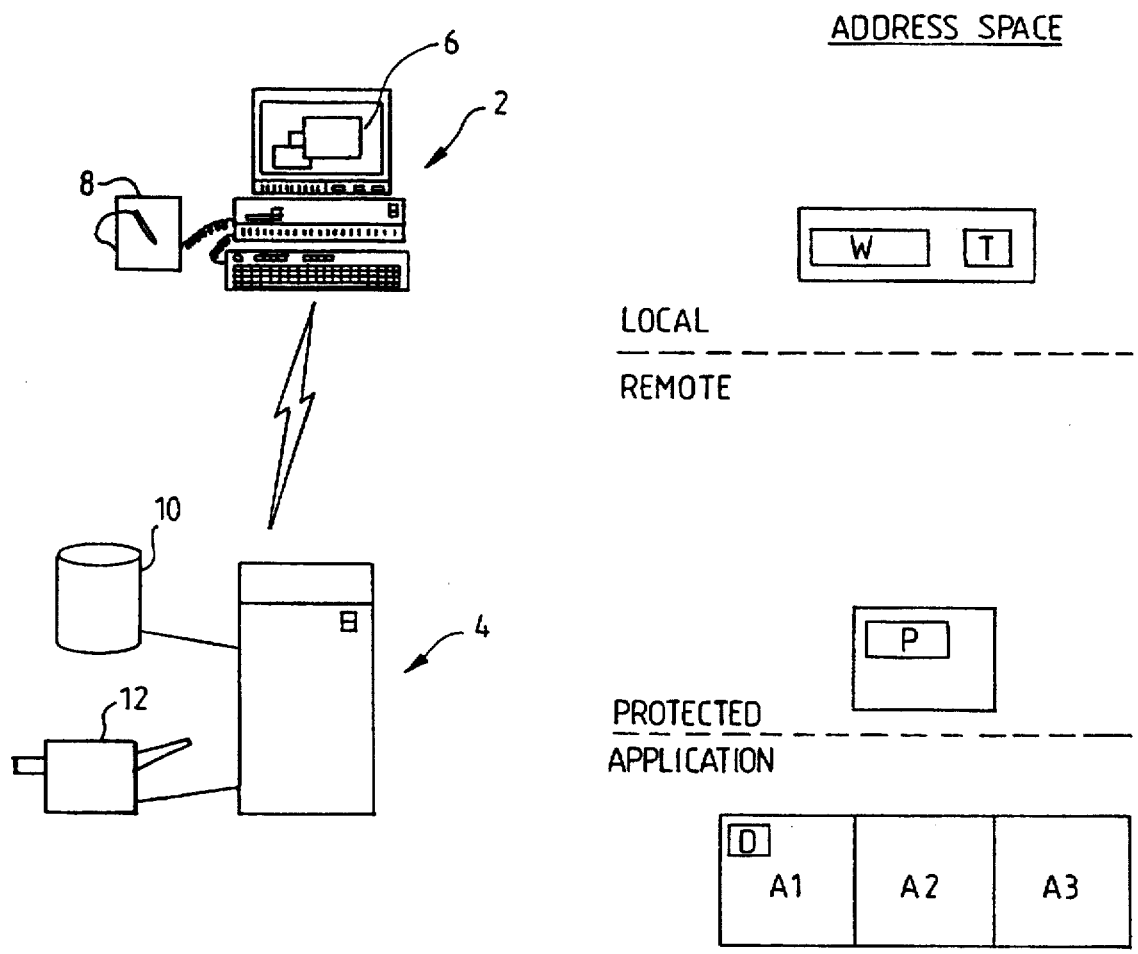
FIG. 4 shows schematically, a method of managing resources in accordance with the present invention.

In accordance with a preferred embodiment of the present invention, shown in FIG. 4, the client system is remote from the server system 2. It should be noted however that the client system and the server may be operating concurrently on the same machine. The server system 2 may be an IBM Personal System/2 computer. The server system has access to local resources such as a graphical user interface 6 and a graphics tablet 8. The server system may also access remote resources such as database 10 and laser printer 12 through the client system. Application programs A1, A2 and A3 are located at the client system and may be run by the server system. Two application programs may be run simultaneously.

The multiple applications A1, A2 and A3 on the client system are unable to adversely affect the behaviours of each other and any other applications on the same client system. They are also unable to impact in any way the data kept by the presentation system on behalf of the other client applications.

The communication between application and client presentation avoids unnecessary overheads caused by continual switching from application address space, this reduction in overhead resulting from an optimal distribution of function between application address space and the display server address space. This distribution is as follows:

1. Resources specific to the application that have no impact on the overall display are stored in the application address space by presentation logic executing in that address space. Examples of such resources are child windows and all graphic presentation orders for the application.
2. Resources which have an effect on the overall system but are managed in the client system are stored in a separate presentation address space common to all applications on a client system. Examples of such resources are the parent windows, the input data sent by the display server system and the exposed regions of the display indicated by the display server to the client system.
3. Resources which have an overall effect but are required to be managed on behalf of all client applications on all client systems sharing the display server are stored on the display server system itself. Examples of such resources are bitmaps, fonts and colour tables shared by the applications and sent to the display server to cause the required drawing of data on the server.

Table 1 (below) shows an example of a client and server system operating in accordance with the present invention.

TABLE 1

| APPLICATION | CLIENT SYSTEM |
|---|---|
| Create main window | ClientSpace:<br>Add main window to window hierarchy<br>Send main window boundary data to Display Server |
| | → Add boundary to list on behalf of client system |
| Create dialog child | |

TABLE 1-continued

| APPLICATION | CLIENT SYSTEM | |
|---|---|---|
| windows | AppSpace:<br>Store child window data for main window in ClientSpace<br>Send graphics data for child windows to Display Server | |
| | | → Draw graphics data into main window |
| Create a Presentation Space to hold graphic data<br>Select fonts and colour tables | AppSpace:<br>Store PS<br>ClientSpace:<br>Send required fonts and colour tables to server | |
| | | → Store resources in server |
| Issue graphic calls into PS | AppSpace:<br>Build graphic orders and send to Server | |
| | | → Draw graphics data into main window<br>Display Server<br>→ Draw graphics data into main window |
| Wait for user input | | Draw pointer in response to input device movement<br>On button input send pointer position and button input to client |
| | ClientSpace<br>Process input data<br>Select app to receive event | ← |
| | | Pass event to App space<br>AppSpace:<br>Generate event and schedule app. |
| Handle input | | ← |

With reference to Table 1 it can be seen that the following steps are undertaken by an application program running on a client system and operating in accordance with the present invention. First of all the application program creates a main window. Data representing this main window is added to the window hierarchy in the client address space and window boundary data is sent to the display server. This boundary data is added, on behalf of the client system, to the list of boundaries for other main windows of other applications.

The application program then creates dialog child windows which are stores in the application address space. The corresponding graphics data for the child windows are sent to the display server to be drawn onto the main window.

Next the application program creates a presentation space to hold graphics data. The presentation space is stored in the application address space. Fonts and colour tables are selected by the application program and stored in the client application space and sent to the server.

Graphic calls are issued to the presentation space by the application program to enable the application address space to build graphic orders before sending them to the server. The graphics data is then drawn onto the main window in the display server by the client system. In response to user input cursor or pointer movement is signalled to the client application space where the input command is processed.

We claim:

1. A data processing apparatus comprising
   a local processor including a display device, the local processor being coupled to a remote processor, for performing distributed multitasking processing with a plurality of application programs executable at said remote processor, and resources of various types including
      at least one local resource associated with the local processor,
      at least one shared resource associated with said remote processor and having an effect on an overall display of the system by said display device, and
      at least one unshared resource associated with said remote processor and having no impact on an overall display of said display device,
   wherein address spaces utilized by each resource are assigned in response to a resource type such that
   said at least one local resource uses address space at said local processor,
   said at least one shared resource is stored in separate presentation address space common to all applications on the remote system in uses protected address space at said remote processor and
   said at least one unshared resource uses and is stored in the application address space of a corresponding application at said remote processor such that only said corresponding application is affected by a corruption of said application address space.

2. A data processing apparatus as claimed in claim 1 further comprising means for buffering requests, from the local processor to the remote processor, for access to resources associated with the remote processor.

3. A data processing apparatus as claimed in claim 2 wherein the buffering means buffers the requests from the local processor before sending them to the remote processor.

4. A method of operating a data processing apparatus having a local processor coupled to a remote processor for performing distributed multitasking processing with a plurality of application programs executable at the remote processor, and resources of various types including at least one local resource associated with the local processor, at least one shared resource associated with the remote processor and at least one unshared resource associated with the remote processor, the method comprising the steps of:

storing each resource within an address space in response to a resource type, including:
   storing the local resources at address space at the local processor;
   storing the shared resources in separate presentation address space common to all applications on the remote system in at protected address space at the remote processor; and
   storing the unshared resources at address space of the corresponding application at the remote processor such that only said corresponding application is affected by corruption of said application address space;
providing a display of overall operation of said multitasking processing;
said at least one unshared resource associated with said remote processor having no impact on said overall display; and
said at least one shared resource having an effect on said overall display.

5. A method of operating a data processing apparatus as claimed in claim 4 further including the step of buffering requests, from the local processor to the remote processor, for access to resources associated with the remote processor.

6. A method of operating a data processing apparatus as claimed in claim 5 wherein step of buffering buffers the requests from the local processor before sending them to the remote processor.

7. Data processing apparatus comprising:
   a first processor coupled to a second processor, for performing distributed multitasking processing with a plurality of application programs executable at said second processor at the direction of a user interacting with said first processor,
   a plurality of resources of various types including:
      a first local resource associated with the first processor,
      a second shared resource that is shared by a plurality of said application programs and is associated with said second processor,
      a third unshared resource that is utilized by a first application program of said plurality of application programs and is associated with said second processor,
   each resource utilizing an address space assigned in response to a resource type wherein:
   said first local resource uses an address space at said first processor, said second shared resource being stored in separate presentation address space common to all applications on the remote system in using a protected address space at said second processor and said third unshared resource uses an address space of said first application program at said second processor such that only said first application program is affected by corruption of said address space utilized by said third unshared resource.

* * * * *